(12) United States Patent
Lutz et al.

(10) Patent No.: US 9,483,232 B2
(45) Date of Patent: Nov. 1, 2016

(54) DATA PROCESSING APPARATUS AND METHOD FOR MULTIPLYING FLOATING POINT OPERANDS

(71) Applicant: ARM Limited, Cambridge (GB)

(72) Inventors: David Raymond Lutz, Austin, TX (US); Neil Burgess, Austin, TX (US)

(73) Assignee: ARM Limited, Cambridge (GB)

( * ) Notice: Subject to any disclaimer, the term of this patent is extended or adjusted under 35 U.S.C. 154(b) by 322 days.

(21) Appl. No.: 14/200,923

(22) Filed: Mar. 7, 2014

(65) Prior Publication Data

US 2015/0254066 A1   Sep. 10, 2015

(51) Int. Cl.
*G06F 7/487* (2006.01)
*G06F 5/01* (2006.01)
*G06F 7/499* (2006.01)
*G06F 7/533* (2006.01)

(52) U.S. Cl.
CPC ............ *G06F 7/4876* (2013.01); *G06F 5/012* (2013.01); *G06F 7/49952* (2013.01); *G06F 7/5336* (2013.01); *G06F 7/49957* (2013.01); *G06F 2207/483* (2013.01)

(58) Field of Classification Search
CPC .............................. G06F 7/487; G06F 7/4876
See application file for complete search history.

(56) References Cited

U.S. PATENT DOCUMENTS

| | | | |
|---|---|---|---|
| 5,276,634 A * | 1/1994 | Suzuki | G06F 7/485 708/205 |
| 5,844,830 A | 12/1998 | Gorshtein et al. | |
| 6,049,865 A * | 4/2000 | Smith | G06F 7/483 708/496 |
| 8,463,834 B2 | 6/2013 | Lutz | |
| 2011/0106868 A1 | 5/2011 | Lutz | |

OTHER PUBLICATIONS

GB Search Report issued Jul. 21, 2015 in GB 1501577.9, 5 pages.
P. Seidel, "How to Half the Latency of IEEE Compliant Floating-Point Multiplication" Proceedings 24$^{th}$ Euromicro Conference, vol. 1, Aug. 1998, pp. 329-332.

(Continued)

*Primary Examiner* — Chuong D Ngo
(74) *Attorney, Agent, or Firm* — Nixon & Vanderhye P.C.

(57) ABSTRACT

A data processing apparatus and method are provided for multiplying first and second normalized floating point operands in order to generate a result, each normalized floating point operand comprising a significand and an exponent. Exponent determination circuitry is used to compute a result exponent for a normalized version of the result, and rounding value generation circuitry then generates a rounding value by shifting a rounding constant in a first direction by a shift amount that is dependent on the result exponent. Partial product generation circuitry multiplies the significands of the first and second normalized floating point operands to generate the first and second partial products, and the first and second partial products are then added together, along with the rounding value, in order to generate a normalized result significand. Thereafter, the normalized result significand is shifted in a second direction opposite to the first direction, by the shift amount, in order to generate a rounded result significand. This provides a particularly efficient mechanism for multiplying floating point numbers, while correctly rounding the result in situations where the result is subnormal.

12 Claims, 9 Drawing Sheets

(56) References Cited

OTHER PUBLICATIONS

B.R. Sheikh et al, "An Asynchronous Floating-Point Multiplier" 2012 IEEE 18th International Symposium on Asynchronous Circuits and Systems, May 2012, pp. 89-96.

A. Ehliar, "Area Efficient Floating-Point Adder and Multiplier with IEEE-754 Compatible Semantics" 2014 International Conference on Field-Programmable Technology, Dec. 2014, pp. 131-138.

Even, G. et al., "A dual precision IEEE floating-point multiplier", Integration, the VLSI journal 29, (2000), pp. 167-180.

Even, G. et al., "A comparison of three rounding algorithms for IEEE floating-point multiplication", (Aug. 29, 1998), 30 pages.

Seidel, P-M, "On the Design of IEEE Complaint Floating-Point Units and Their Quantitative Analysis", Dissertation, (1999), 202 pages.

Seidel, P-M, "How to Half the Latency of IEEE Complaint Floating-Point Multiplication", 4 pages, printed on Mar. 6, 2014.

\* cited by examiner

SINGLE PRECISION

E = 11111111     SPECIAL NUMBER     (EG. NaN, ∞)

E = 00000000     ZERO OR SUBNORMAL     $(-1)^S \times 0.F \times 2^{-126}$ E = [OTHER]     NORMAL     $(-1)^S \times 1.F \times 2^{(E-127)}$

FIG. 1A

DOUBLE PRECISION

E = 11111111111     SPECIAL NUMBER

E = 00000000000     ZERO OR SUBNORMAL     $(-1)^S \times 0.F \times 2^{-1022}$ E = [OTHER]     NORMAL     $(-1)^S \times 1.F \times 2^{(E-1023)}$

DATA PROCESSING APPARATUS AND METHOD FOR MULTIPLYING FLOATING POINT OPERANDS

BACKGROUND

The present invention relates to a data processing apparatus and method for multiplying floating point operands.

It is known to provide data processing systems with the ability to manipulate floating point numbers. The hardware mechanisms for performing floating point multiplication typically use the multiplier and multiplicand to generate numerous partial products. Various forms of carry-save adders are then used to reduce the partial products to two partial products. These final two partial products are then added before being rounded to produce the final product result.

A problem with the above is how to deal with subnormal results. Subnormal results are where the exponent value has the minimum permitted value and the significand (also referred to as a mantissa) is less than one, e.g. 0.001101. The nature of subnormal numbers is familiar to those in this technical field. One way of dealing with subnormal numbers is to treat them as exceptions and handle their processing in software. This is a low performance solution. If subnormal numbers are to be handled in hardware, then a problem is that the output of the adder from the two partial products is unlikely to be properly aligned for rounding. This requires that adder output to be shifted and then rounded using a further adder. The shifting and the further adder for the rounding introduce undesirable additional hardware and delay.

Commonly owned U.S. Pat. No. 8,463,834, the entire contents of which are hereby incorporated by reference, introduces an improved mechanism for multiplying floating point operands, whilst being able to deal with subnormal results, the mechanism described in that patent using an extra multiplication cycle to left or right shift the partial products before adding and rounding. By such an approach, it was then possible for the rounding constant to always be injected at a fixed location, thereby significantly simplifying the rounding process. However, whilst the approach does simplify the problem of dealing with rounding within subnormal results, it does require the use of an extra shift stage for the partial products, which can adversely affect performance.

It would hence be desirable to provide a mechanism that provided improved performance when multiplying floating point operands, whilst still enabling correct rounding for subnormal results.

SUMMARY

Viewed from a first aspect, the present invention provides a data processing apparatus for multiplying first and second normalized floating point operands to generate a result, each normalized floating point operand comprising a significand and an exponent, the data processing apparatus comprising: exponent determination circuitry configured to compute a result exponent for a normalized version of the result; rounding value generation circuitry configured to generate a rounding value by shifting a rounding constant in a first direction by a shift amount that is dependent on the result exponent; partial product generation circuitry configured to multiply the significands of the first and second normalized floating point operands to generate first and second partial products; adder circuitry configured to add the first and second partial products and the rounding value to generate a normalized result significand; and shifting circuitry configured to shift the normalized result significand in a second direction opposite to said first direction, by said shift amount in order to generate a rounded result significand.

In accordance with the present invention, a result exponent is computed for a normalised version of the result (i.e. where the significand of the result is of the form 1.F where F is the fraction portion of the result), and a rounding value is then generated by shifting a rounding constant in a first direction by a shift amount that is dependent on the result exponent. The first direction is the direction towards the most significant bit, and shifting in the first direction is typically implemented by performing a left shift. Once the two partial products have been generated during the multiplication process, the rounding value is then added during the process of adding the first and second partial products, in order to generate a normalised result significand. Thereafter, the normalised result significand is shifted in the opposite direction to the first direction (typically by performing a right shift), and again the amount of shifting applied is determined by the shift amount, the resultant significand then being the rounded result significand (subject to any adjustment that may be required based on guard and sticky bits, depending on the rounding mode).

By determining a shift amount dependent on the result exponent for a normalised version of the result, and then applying that shift amount to a rounding constant in order to generate a rounding value (such that the rounding constant is then at the correct rounding location), this allows the correct rounding bits to be determined for adding to the first and second partial products when generating the normalised result significand. The mechanism can hence accommodate the variable nature of the rounding location for subnormal results, the technique allowing the correct result to be obtained in a very efficient manner for both normal floating point and subnormal floating point results.

The result significand generated by the above described mechanism may need an adjustment to be made dependent on the guard and sticky bits. In one embodiment, the present invention provides a mechanism for correctly capturing the guard and sticky bits within the normalised result significand, so that they can be used to determine any required adjustment. In particular, in one embodiment, the data processing apparatus further comprises mask generation circuitry configured to generate a mask value by shifting a mask constant in the first direction by the shift amount, and guard and sticky bit detection circuitry configured to apply the mask value to the normalized result significand to identify guard and sticky bits within the normalized result significand. Result adjustment circuitry is then configured to adjust the rounded result significand dependent on the guard and sticky bits. Hence, as with the rounding value, the mask value is determined by shifting a constant (in this case a mask constant) in the first direction by the shift amount (as discussed earlier, the shift amount being dependent on the result exponent for the normalised version of the result). As a result, the mask value is correctly aligned to capture the guard and sticky bits, having regard to the size of the exponent in situations where the result is subnormal. The above approach provides a particularly efficient mechanism for extracting the correct guard and sticky bits from the normalised result significand.

In one embodiment, the shift amount is set to identify a zero shift if the result exponent is in a normal range. As a result, a non-shifted version of the rounding constant will be input to the adder circuitry when generating the normalised result significand, and no subsequent shifting of the normalised result significand will be required when generating the rounded result significand. However, whenever the result is subnormal, the shift amount will be non-zero, and the extent of the shift applied will be dependent on the size of the subnormal exponent, thereby allowing the correct inputs for rounding to be captured in an efficient manner that can accommodate the variability in the rounding location for subnormal results.

In one embodiment, the data processing apparatus further comprises an input interface for receiving first and second input floating point operands used to form said first and second normalized floating point operands, the data processing apparatus comprising: normalization circuitry configured to be responsive to one of said first and second input floating point operands being a subnormal operand, to form the corresponding normalized floating point operand to have a significand formed by shifting the significand of the subnormal operand in said first direction by a normalising amount and to have an exponent formed by adjusting the exponent of the subnormal operand dependent on said normalising amount. Whilst the received first and second input floating point operands may both be normal floating point operands, with there still being the possibility that the result is subnormal dependent on the size of the exponents of the input floating point operands, another scenario that can give rise to a subnormal result that can still be within the available range for expressing subnormal results is a situation where one of the input floating point operands is subnormal. In such instances, the above-mentioned normalisation circuitry will create a normalised version of that floating point operand prior to the multiplication operation being performed. This also then ensures that the exponent determination circuitry is able to compute a result exponent for a normalised version of the result, as is required to correctly identify the shift amount to be used by the apparatus.

In one embodiment, the apparatus further comprises shift amount generation circuitry configured to generate said shift amount such that, if the result exponent is subnormal, the shift amount is dependent on a difference between the result exponent and a minimum normal exponent value. In particular, the shift amount increases the larger the difference between the result exponent and the minimum normal exponent value.

In one embodiment, the shift amount generation circuitry is configured to restrict the shift amount to not exceed a predetermined maximum shift amount. The storage format for floating point numbers is such that there is a minimum subnormal value that can be expressed, and if the floating point value is any smaller than that it has to be treated as a zero value. The predetermined maximum shift amount is in one embodiment determined having regard to that minimum subnormal floating point operand which can be represented in accordance with the storage format, and ensures that the shift circuitry provided within the apparatus can be constrained to a suitable size having regard to the maximum amount of shift that can in practice be applied in respect of subnormal values expressible in accordance with the storage format.

In one embodiment, the rounding constant is dependent on a rounding mode used by the data processing apparatus. For example, in round to nearest even mode, the rounding constant will be different to the rounding constant used in round up mode.

In one embodiment, the rounding value generation circuitry is configured, when shifting the rounding constant in said first direction by said shift amount, to set to a predetermined bit value the least significant bit positions from which the rounding constant is shifted, and to include those least significant bit positions in the rounding value along with the shifted rounding constant. Further, in one embodiment, the predetermined bit value is dependent on a rounding mode used by the data processing apparatus.

In one embodiment, each bit of the mask constant is set to a predetermined bit value, and the mask generation circuitry is configured, when shifting the mask constant in said first direction by said shift amount, to set to said predetermined bit value the least significant bit positions from which the mask constant is shifted and to include those least significant bit positions in the mask value along with the shifted mask constant.

Viewed from a second aspect, the present invention provides a method of operating a data processing apparatus to multiply first and second normalized floating point operands in order to generate a result, each normalized floating point operand comprising a significand and an exponent, the method comprising: computing a result exponent for a normalized version of the result; generating a rounding value by shifting a rounding constant in a first direction by a shift amount that is dependent on the result exponent; multiplying the significands of the first and second normalized floating point operands to generate first and second partial products; adding the first and second partial products and the rounding value to generate a normalized result significand; and shifting the normalized result significand in a second direction opposite to said first direction, by said shift amount in order to generate a rounded result significand.

Viewed from a third aspect, the present invention provides a data processing apparatus for multiplying first and second normalized floating point operands to generate a result, each normalized floating point operand comprising a significand and an exponent, the data processing apparatus comprising: exponent determination means for computing a result exponent for a normalized version of the result; rounding value generation means for generating a rounding value by shifting a rounding constant in a first direction by a shift amount that is dependent on the result exponent; partial product generation means for multiplying the significands of the first and second normalized floating point operands to generate first and second partial products; adder means for adding the first and second partial products and the rounding value to generate a normalized result significand; and shifting means for shifting the normalized result significand in a second direction opposite to said first direction, by said shift amount in order to generate a rounded result significand.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

In floating point representation, numbers are represented using a sign bit, exponent bits E, and fraction bits F. A significand is a number 1.F or 0.F, depending on the value of the exponent E, namely 0.F if E is zero, and 1.F otherwise. The integer part of the significand (0. or 1.) is not explicitly stored in the IEEE-754 Standard, but is required for the multiplication. The sign bit represents whether the floating point number is positive or negative, the significand represents the significant digits of the floating point number, and the exponent represents the position of the radix point (also known as a binary point) relative to the significand. By varying the value of the exponent, the radix point can "float" left and right within the significand. This means that for a predetermined number of bits, a floating point representation can represent a wider range of numbers than a fixed point representation (in which the radix point has a fixed location within the significand). However, the extra range is achieved at the expense of reduced precision since some of the bits are used to store the exponent. Sometimes, a floating point arithmetic operation generates a result with more significant bits than the number of bits used for the significand. If this happens then the result is rounded to a value that can be represented using the available number of significant bits.

Figure 1A:
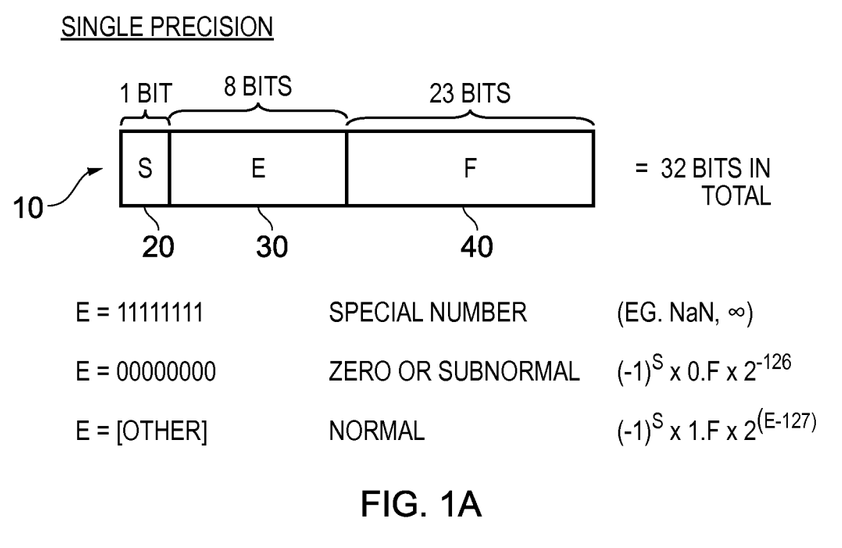
FIGS. 1A and 1B illustrate how floating point numbers are stored within a register or memory in accordance with a single precision format and a double precision format, respectively.
Figure 1B:
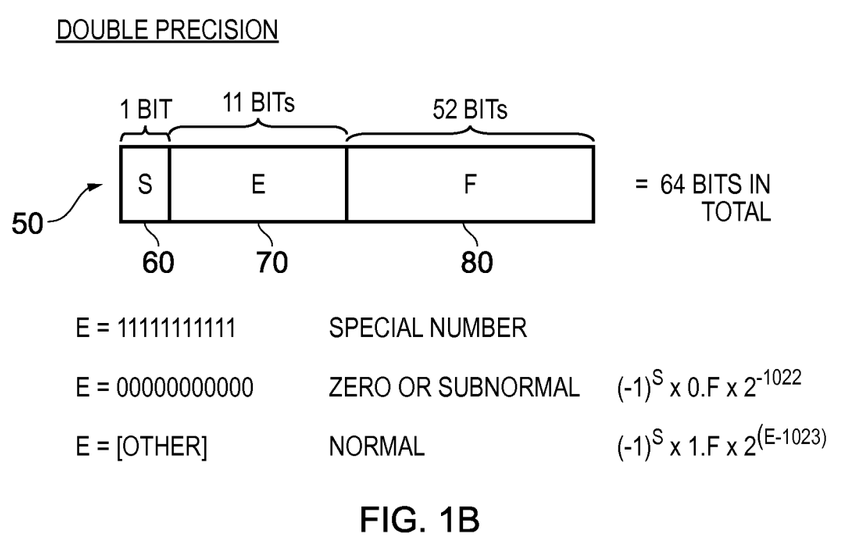

FIGS. 1A and 1B show how floating point numbers are stored within a register or memory. In a single precision representation as shown in FIG. 1A, 32 bits are used to store the floating point number 10. One bit is used as the sign bit S 20, eight bits are used to store the exponent E 30, and 23 bits are used to store the fractional portion F 40 of the significand. For normal values, the 23 bits of the fractional portion F, together with an implied bit having a value of one, make up a 24-bit significand 1.F. The radix point is initially assumed to be placed between the implied bit and the 23 stored bits of the significand. The stored exponent E is biased by a fixed value 127 such that in the represented floating point number the radix point is shifted left from its initial position by E-127 places if E-127 is negative (e.g. if E-127=-2 then a significand of 1.01 represents 0.0101), or right from its initial position by E-127 places if E-127 is positive (e.g. if E-127=2 then a significand of 1.01 represents 101). The bias is used to make it simpler to compare exponents of two floating point values as then both negative and positive shifts of the radix point can be represented by a positive value of the stored exponent E. As shown in FIG. 1, the stored representation S[31], E[30:23], F[22:0] represents a number with the value $(-1)^S*1.F[22:0]*2^{(E-127)}$. A single-precision floating point number in this form is considered to be "normal". If a calculated floating point value is not normal (for example, it has been generated with the radix point at a position other than between the left-most two bits of the significand), then it is normalized by shifting the significand left or right and adjusting the exponent accordingly until the number is of the form $(-1)^S*1.F[22:0]*2^{E-127}$.

A double precision format 50 is also provided as shown in FIG. 1B, in which the significand and exponent are represented using 64 stored bits. The 64 stored bits include one sign bit 60, an 11-bit exponent 70 and the 52-bit fractional portion F 80 of a 53-bit significand 1.F. In double precision format the exponent E is biased by a value of 1023. Thus, in the double precision format a stored representation S[63], E[62:52], F[51:0] represents a floating point value $(-1)^S*1.F[51:0]*2^{E-1023}$.

As well as normal floating point values, the floating point representation can also represent other quantities. If the exponent E for a value has all its bits set to 1 then this represents a special number, such as infinity and "not a number" (NaN) values, which are results which cannot be represented using a real number, such as the square root of a negative number, the division 0/0, the result of a calculation using infinity and the result of a function applied to a value outside its defined range (e.g. the inverse sine or cosine of number less than −1 or greater than +1). When the exponent has all its bits equal to 1, infinity is typically represented by the significand bits F all being equal to 0, while other NaN values are represented by non-zero values for the significand. Techniques for handling infinity and NaN values are well known and any prior art technique can be used. Therefore the handling of these numbers will not be discussed in detail herein.

When the exponent E has its bits all equal to zero then this represents either zero or a subnormal number. The floating point value is equal to zero if its significand bits F are all zero. If any bit of the significand is equal to 1 then the number is a subnormal number. A subnormal number has its implicit bit of the significand equal to zero instead of one as in the case of normal numbers. This allows values smaller than the smallest number represented using a normal number. For example, in the single precision case the smallest value representable using a normal number is $1.0*2^{-126}$ while if a subnormal number is used then the smallest representable value is $2^{-14}$ $(0.00000000000000000000001*2^{-126})$, since the leading one can now be in the least significant bit of the 24-bit fraction F.

When performing multiplication of floating point operands, the multiplication is accomplished by multiplying the significands and adding the exponents. If the exponent sum e is less than the smallest normal exponent n, then the significand product must be right shifted by (n−e) bits. In the case of double precision (DP) floating-point, n is −1022. If the example of multiplying the two normal floating point numbers $2^{-500}$ and $2^{-540}$ is considered, this would give rise to the subnormal product $2^{-1040}$, and accordingly in that example the significand product would have to be right shifted by −1022−−1040=18 bits.

This right shifting creates problems when seeking to perform injection rounding. Double precision significands have 53 bits, so injection rounding happens at the $53^{rd}$ bit of a normalized 106-bit product. If this product is right shifted by 18 bits, then the rounding needs to happen at the $35^{th}$ bit instead.

Injection rounding is described in published US Patent Applications US-A-2006/0117080 and US-A-2006/0136543. The content of both of these earlier applications is incorporated herein in its entirety by reference.

The techniques of the embodiments described below provide a mechanism for performing injection rounding at the correct (non-fixed) position, and also for computing the guard and sticky bits for determination of the inexact flag and rounding correction.

Figure 2:
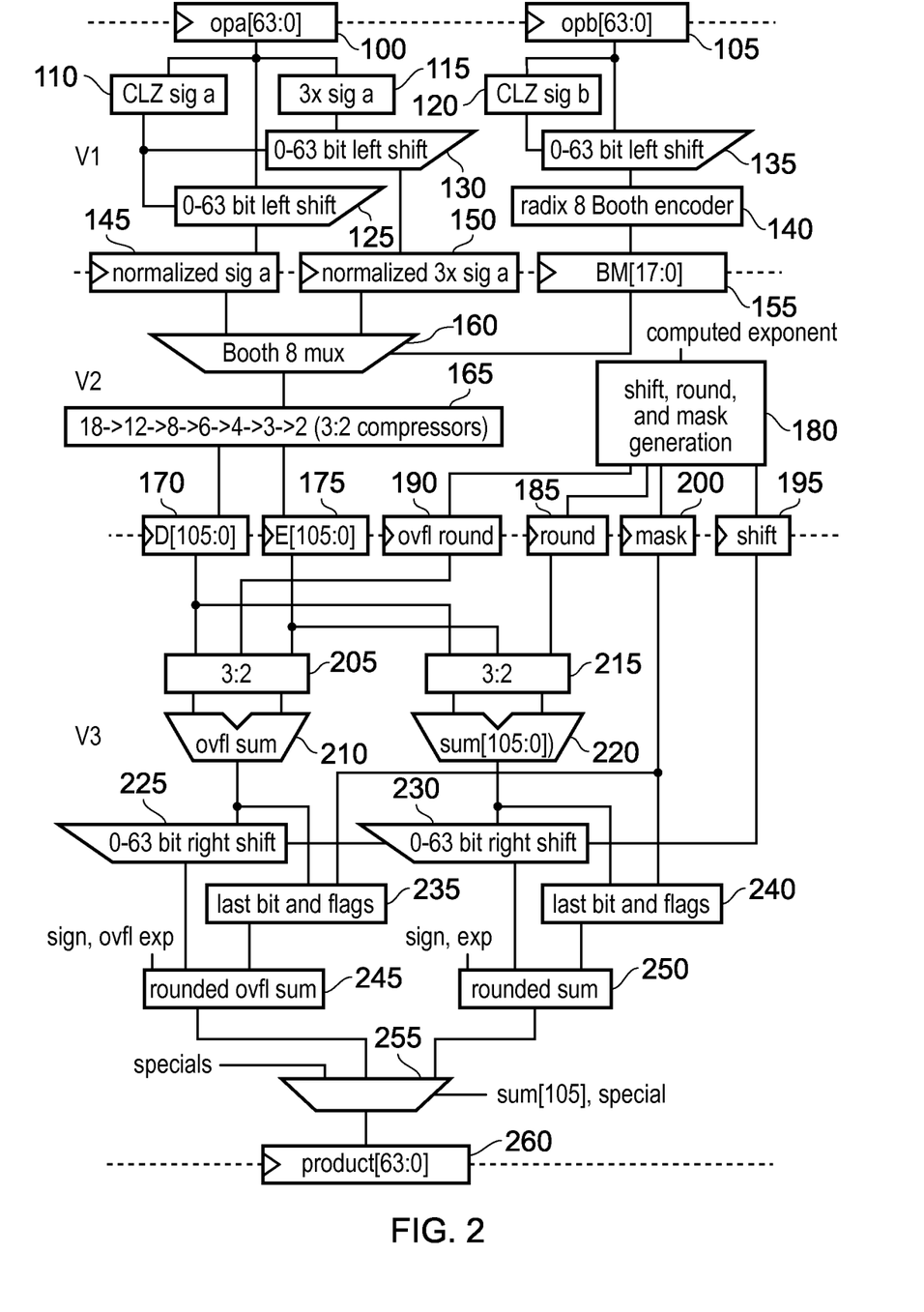
FIG. 2 is a block diagram of components provided within a data processing apparatus in accordance with one embodiment, and in particular shows the significand processing path in accordance with that embodiment.

FIG. 2 schematically illustrates a floating point multiplier pipeline. It will be appreciated that this floating point multiplier pipeline is typically part of a data processing apparatus, such as a processor core embodied as an integrated circuit. Program instructions being executed by the processor can specify floating point multiplication operations to be performed. This type of use of a floating point multiplier within an overall system will be familiar to those in this technical field. The following will be described in terms of the manipulation of double precision numbers as defined as part of the IEEE 754 Standard. It will be appreciated that the present techniques may be used with floating point numbers of other forms.

The two floating point operands to be multiplied together are received into the input registers 100, 105. In the first stage V1, any required normalisation of the input operands A and B is performed. In particular, the significand of each operand is created from the fraction portion of the operands, the significand being 1.F if the exponent is non-zero and being 0.F if the exponent is zero. Count leading zero (CLZ) circuitry 110, 120 is used to determine the number of contiguous bit positions, starting from the most significant bit of the significand, that contain logic zero values. If the input operands are normal floating point operands, it will be appreciated that there will be no leading zeros, and accordingly the leading zero count output by the circuits 110, 120 will identify no leading zeros. However, for subnormal numbers, there will be at least one leading zero, and potentially many more leading zeros, depending on the value of the fraction portion of the significand. The leading zero count is then forwarded to the left shift circuits 125, 135 from the corresponding CLZ circuits 110, 120, where the relevant significands are left-shifted dependent on the output from the CLZ circuits. The outputs from the left shift circuits 125, 135 then represent the normalised significands.

The normalised significand output by the left shift circuit 125 is stored within the register 145. However, the normalised significand output by the left shift circuit 135 is first subjected to Booth encoding in the circuitry 140 in order to set up the Booth multiplier terms, which are then stored within the register 155. In the example given, radix 8 Booth encoding is used, but it will be appreciated that other forms of Booth encoding could be used if desired. When using radix 8 Booth encoding, the normalised significand output from the left shift circuitry 135 is considered three bits at a time, and expressed as a multiple of the significand of operand A between +4 and −4. Whilst multiples of 0, 1, 2 and 4 can be readily obtained through standard shift operations, it is useful to separately calculate three times the significand of operand A, and this is performed by the circuitry 115, with the output then being subjected to a left shift by the circuitry 130 based on the leading zero count output by the circuitry 110, with the normalised three times significand then being stored within the register 150.

In cycle V2, the multiplication of the significands is performed using the multiplexer circuitry 160, and then the circuitry 165 including 3:2 compressors is used to reduce the partial products down to two 106-bit partial products that are then stored within the registers 170, 175. Booth multiplication will be readily understood to those familiar with this technical field, and accordingly will not be discussed further. It will also be appreciated that Booth multiplication is not required for this technique, and any multiplication method which results in two partial products may be used.

Also in stage V2, various circuit components denoted by the block 180 in FIG. 2 are used to generate a number of values required to correctly perform rounding for both normal products and subnormal products. In particular, for subnormal products, the values generated enable injection rounding to be performed at the required bit position taking account of the right shifting that needs to be performed having regard to the value of the subnormal exponent.

Figure 3:
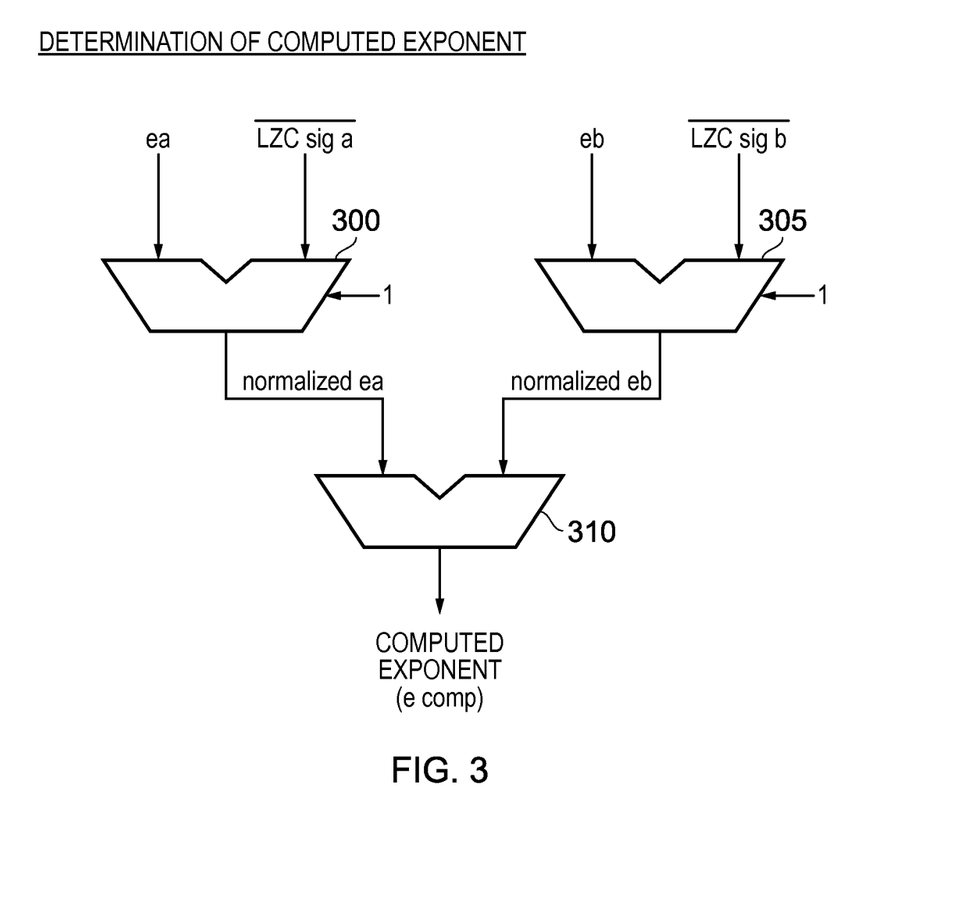
FIG. 3 illustrates circuitry used to determine a computed exponent in accordance with one embodiment.

The circuitry 180 receives a computed exponent generated in an exponent processing pipeline during stage V1. Whilst the computed exponent can be generated in a variety of ways, one approach that may be used to generate the computed exponent is shown in FIG. 3. In particular, the leading zero count output by circuitry 110 is subtracted from the exponent ea of operand A using the adder 300 and similarly the leading zero count from the circuitry 120 is subtracted from the exponent eb of operand B using the adder 305. This results in the output of two normalised exponents, which are then added together by the adder 310 in order to generate the computed exponent (ecomp). If both of the input operands are normal floating point numbers, it will be appreciated that there will be a zero value output by both CLZ circuits 110, 120, and accordingly no adjustment will be performed by the adders 300, 305 prior to the exponents being added together by the adder 310. However, if one of the input operands is subnormal, then the output from one of the CLZ circuits 110, 120 will be non-zero, and an adjustment will be made to one of the exponents prior to the addition being performed within the adder 310. Whilst in principle, both input operands could be subnormal, when performing a multiplication of two subnormal operands, the resultant exponent will be out of range for representation within the double precision format discussed in FIG. 1B, and accordingly the result of the multiplication will be zero. This is hence an uninteresting case for the purposes of the techniques described herein.

Figure 4:
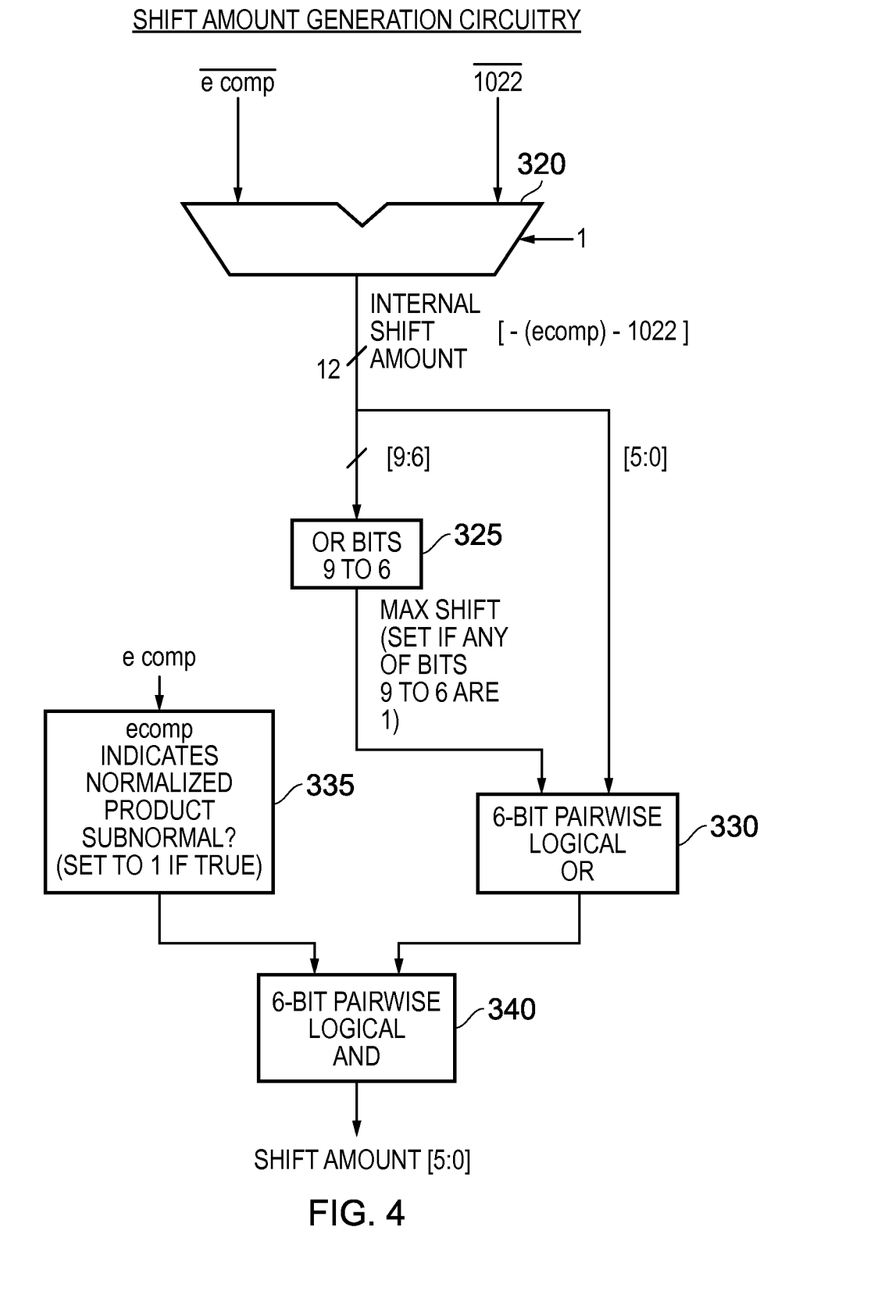
FIG. 4 illustrates circuitry provided to compute a shift amount in accordance with one embodiment.

Once the computed exponent has been generated as an input to the circuitry 180, shift amount generation circuitry within the circuit block 180 is used to generate a shift amount value which is then stored in the register 195. In the described embodiment, the shift amount value is a six-bit value. Whilst it may be generated in a variety of ways, FIG. 4 illustrates one arrangement of components that can be used to generate the shift amount from the computed exponent. Firstly, the adder 320 is used to perform the computation −ecomp −1022 to produce an internal shift amount value which is 12 bits in size. Whereas the inputs are 11 bits in size, the output is 12 bits in size to enable all potential bits of the addition to be captured. However, the top two bits are ignored for the purposes of the processing performed by the shift amount generation circuitry, those bits being used to capture sign information.

The lower six bits of the internal shift amount output by the adder 320 are routed to the six-bit pairwise logical OR circuitry 330. Bits 6 to 9 are subjected to a logical OR operation in the circuitry 325, such that a logic one value is output if any of those bits are set to a logic one value. That value is provided at the other input to each of the input OR gates within the six-bit pairwise logic OR circuit 330. As a result it will be understood that if any of bits 9 to 6 are set, the output from the circuit 330 will be a six-bit value comprising all ones, thereby identifying a maximum shift value. Otherwise, the original least significant six bits output from the adder 320 will be forwarded on un-amended as the output from the six-bit pairwise logic OR circuit 330.

The output from the circuit block 330 then represents a shift amount value to be used in situations where the computed exponent indicates that the normalised product is subnormal. However, if the normalised product is within the normal range, the shift amount is cleared to a logic zero value. In one embodiment, this is achieved by the circuitry 335 detecting whether the computed exponent indicates that the normalised product is subnormal, that circuitry producing a logic one value in that situation and a logic zero value otherwise. A six-bit pairwise logic AND operation is performed by the component 340 in order to pass the output from the circuit block 330 unamended in the event that the normalised product is subnormal, and otherwise causing the shift amount to be cleared to all zeros (i.e. if the normalised product is in the normal range).

Figure 5A:
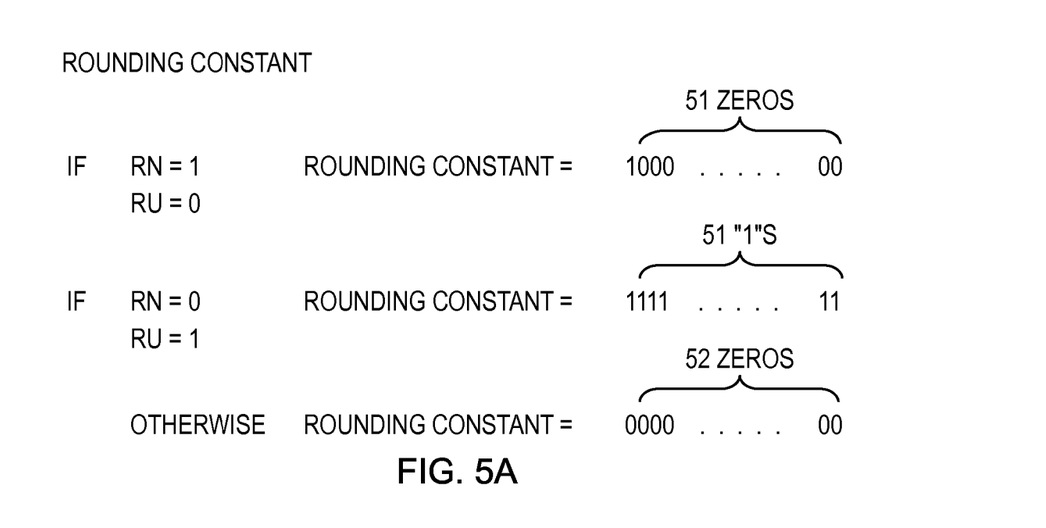
FIG. 5A illustrates rounding constants used in different rounding modes.

The rounding mode is an input to the multiplication operation, and in one embodiment can either be RZ (no rounding), RN (round to nearest even) or RU (round up). Within the circuit block 180, a 52-bit rounding constant is generated as shown schematically in FIG. 5A. In particular, for round to nearest even mode, the rounding constant is a logic one value followed by 51 logic zero values. If instead the round up mode is selected then the rounding constant is a logic one value followed by 51 logic one values. For RZ mode, the rounding constant is set equal to 52 logic zero values.

Figure 5B:
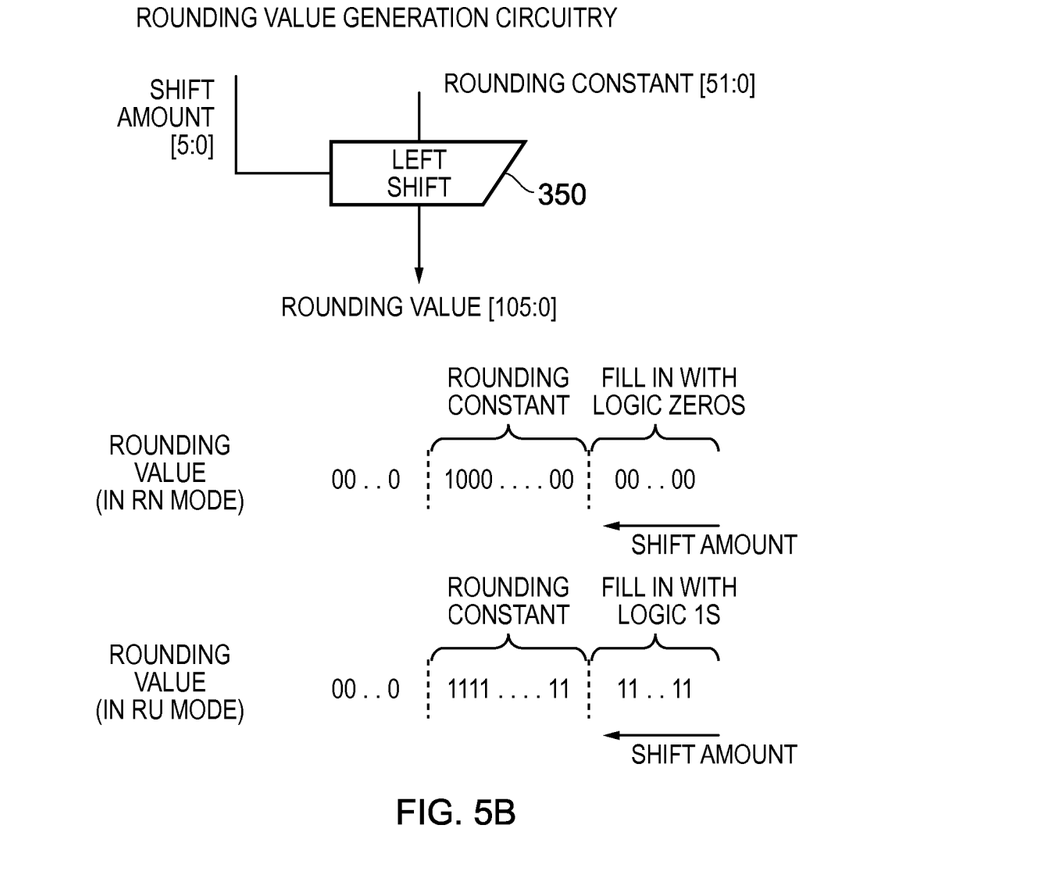
FIG. 5B illustrates rounding value generation circuitry in accordance with one embodiment.

Rounding value generation circuitry is then used to generate a rounding value to be stored within the register 185. FIG. 5B illustrates how the rounding value is generated in one embodiment. In particular, the rounding constant is input to the left shift circuitry 350, which performs a left shift operation based on the earlier computed shift amount in order to produce a 106-bit rounding value. At the input, the bits to the left of the rounding constant are all logic zero values. As the left shift is performed, the least significant bit positions from which the rounding constant is shifted are filled in with either logic zero values (for round to nearest even mode) or logic one values (for round up mode). For RZ mode, the rounding constant is all zeros, and the rounding value is also set to all zeros to identify that no rounding is performed. An overflow rounding value is also produced and stored within the register 190. The overflow rounding value is used in the overflow sum path, and the overflow sum path is only used for normal products. The overflow round value is computed by left shifting by one-bit the overflow value stored within the register 185.

Figure 6:
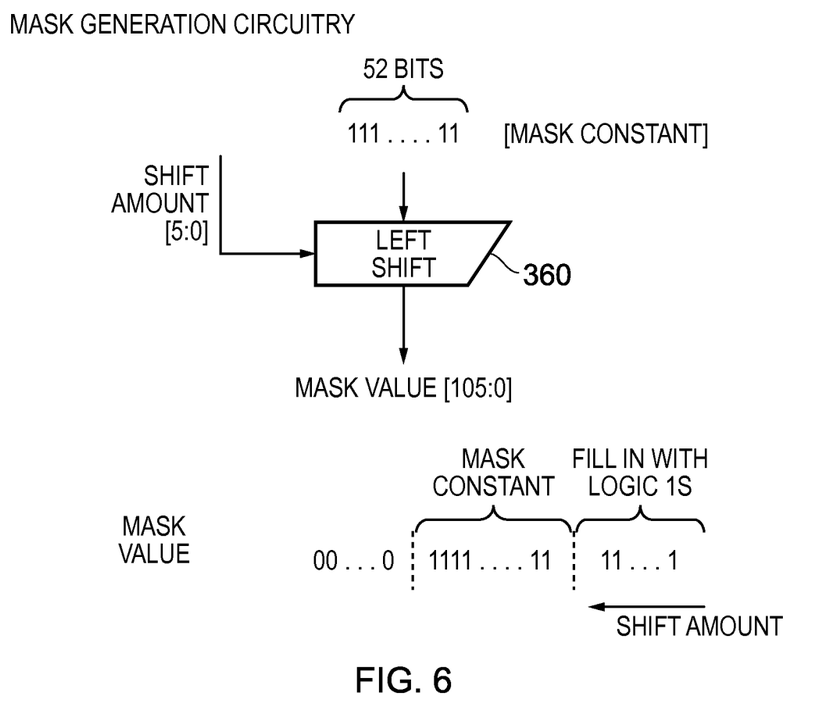
FIG. 6 illustrates mask generation circuitry in accordance with one embodiment.

As shown in FIG. 2, the circuitry 180 is also used to generate a mask value for storage in the register 200, the mask value then being used in the final stage to retrieve guard and sticky bits needed for detecting any rounding adjustments required, and for the setting of flags such as the inexact flag. FIG. 6 illustrates mask generation circuitry that may be included within the circuit block 180 to generate the mask value. In particular, a 52-bit mask constant is generated consisting of all logic one values. That mask constant is then subjected to a left shift operation by the circuit 360, based on the shift amount. This produces a 106-bit mask value. Prior to the left shift operation being performed, all the bits to the left of the mask constant are set to a logic zero value. As the left shift is performed, any least significant bits from which the mask constant is shifted are filled in with logic one values.

In the final stage V3, the two partial products are read from the registers 170, 175 and added together along with the two rounding values. In particular, in an overflow sum path, the partial products are added together with the overflow rounding value from the register 190 using the adder circuitry 205, 210 in order to generate an overflow sum value. Similarly, within a standard sum path, the two partial products are added together with the rounding value 185 within the adder circuitry 215, 220 to generate a sum value. The sum output by the adder 220 is right shifted by the shift amount using the right shift circuitry 230. Further, the overflow sum output by the adder 210 is right shifted by "shift amount −1" using the right shift circuitry 225.

As mentioned earlier, for subnormal products, the final sum used will be derived from the output of the standard sum path. Due to the way the rounding value is determined, it will be appreciated that the rounding value is incorporated at the correct bit position during the generation of the sum, taking account of the right shift that will then be required to be performed by the circuitry 230 in order to de-normalise the resultant sum in order to generate the correct significand for the result (taking account of the fact that the internal representation will require the exponent to have been adjusted to the minimum representable exponent value, namely −1022, in the specific example of a double precision number).

Whilst the sums are being right shifted, the mask is applied to the outputs from the adders 210, 220 in order to capture the guard and sticky bits. As will be understood by those skilled in the art, the guard and sticky bits are used to correct the low order bit in each of the two sums, the necessary adjustment being incorporated within the blocks 245, 250 in order to generate the rounded overflow sum and the rounded sum. The relevant sign and exponent values are also incorporated at this point, and then the appropriate result is selected based on whether the most significant bit of the output from the standard sum adder 220 is set. If it is set then the overflow product is selected, whereas otherwise the standard product is selected. It will be appreciated that special numbers such as NaNs and infinities are handled separately, and those special values can be selected by the multiplexer 255 based on an appropriate control signal, as shown in FIG. 2. For subnormal numbers, it will be understood that the most significant bit of the output from the adder 220 will not be set, and accordingly the output from the circuitry 250 will always be selected as the result.

The 106-bit output sums from the adders 210, 220 contain the final floating-point significand in their upper bits. The bit immediately to the right of the result is the guard bit, and the logical OR of all of the bits to the right of the guard bit form the sticky bit. As will be understood by those skilled in the art, the guard and sticky bits are used to correct rounding for the round to nearest even rounding mode, and they are also used to compute the inexact flag. These processes are performed within the last bit and flags circuits 235, 240.

Figure 7A:
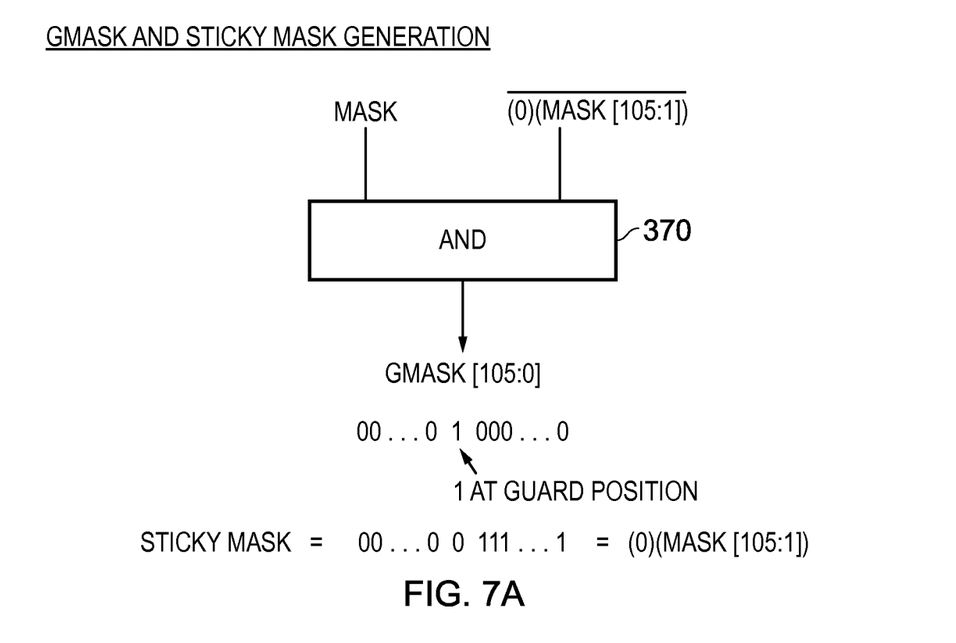
FIG. 7A illustrates the generation of a guard bit mask and a sticky bit mask in accordance with one embodiment.

Considering the last bit and flag circuitry 240, FIG. 7A illustrates how both a guard mask (also referred to herein as a G-mask) and a sticky mask are generated from the mask value stored in the register 200. In particular, a logical AND circuit 370 receives the mask value and also a second value whose most significant bit is set to zero and whose remaining bits are formed by the inverse of bits 105 to 1 of the mask value. This results in the generation of a 106-bit G-mask value which is all zeros except for at one bit position, where a logic one value will be contained, this logic one value identifying the guard position. The sticky mask is then formed by a 106-bit value whose most significant bit is set to zero, and whose remaining bits are formed by bits 105 to one of the mask value. It will be appreciated that the sticky mask then contains logic zero values for all bit positions which contain the final sum and for the guard bit position, but has logic one values for all of the bit positions within the sum that contain the sticky bits.

Figure 7B:
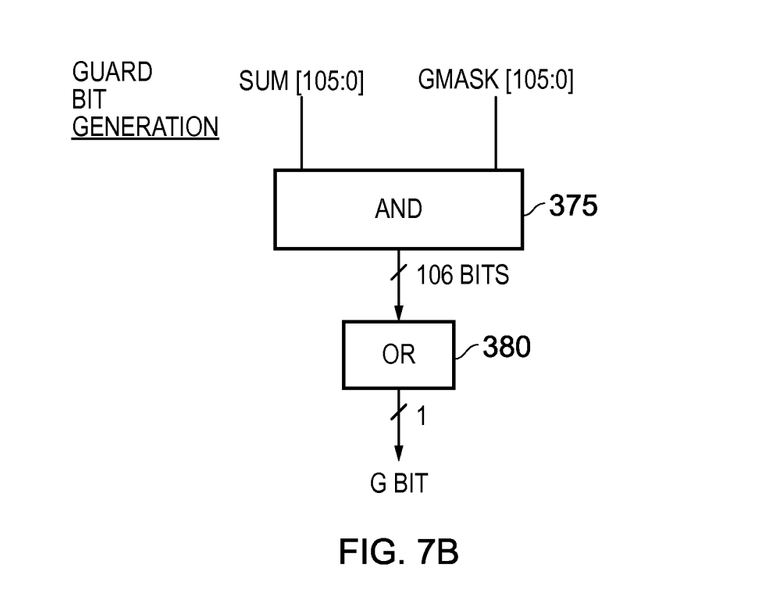
FIG. 7B illustrates components used to generate the guard bit in accordance with one embodiment.
Figure 7C:
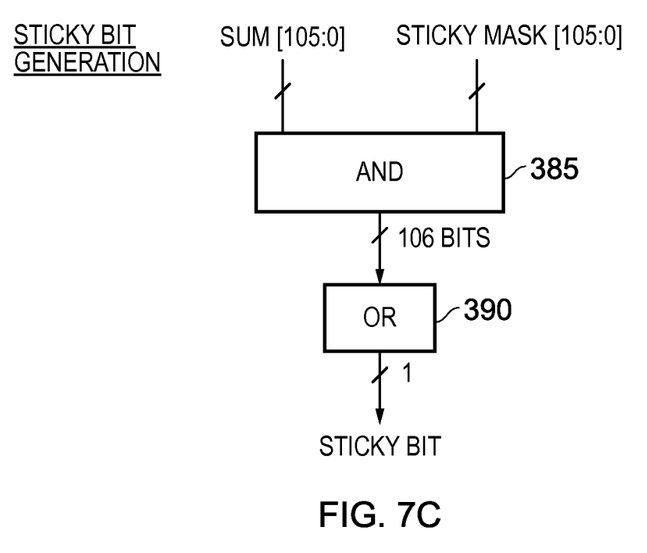
FIG. 7C illustrates components used to generate the sticky bit in accordance with one embodiment.

The circuitry 240 can then generate the guard bit as illustrated in FIG. 7B. In particular, the sum and the G-mask are input to an AND function 375, which produces a 106-bit output. Due to the nature of the G-mask, it will be appreciated that these 106 bits will be all zeros, if the guard bit within the sum is zero, but will include one logic one value if the guard bit in the sum is set to a logic one value. Accordingly, a logical OR function 380 is performed on the 106 bits in order to generate the guard bit. As shown in FIG. 7C, the sticky bit can be generated in a similar way using the sum and the sticky mask. Again a logical AND function is performed by the circuitry 385 resulting in the generation of a 106-bit value. If any of the sticky bits are at a logic one value, there will be at least one logic one value in the output from the AND gate, and accordingly a logical OR function 390 is performed in order to generate the sticky bit (which will either have a value of zero or one).

The guard mask and sticky mask generated within the last bit and flag circuitry 235 for use in connection with the overflow sum are the same for subnormal results, and are shifted one bit left for normal results. Hence, the generation of those two masks can be expressed as follows:

govfl_mask=(g_mask[105:0]& {106{exp_zero}})
  |({g_mask[104:0], 1'b0} & {106{~exp_zero}});
ovfl_sticky_mask=(sticky_mask[105:0]&
{106{exp_zero}})
  |({sticky_mask[104:0], 1'b1} & {106{~exp_zero}});

These overflow masks are then applied to the overflow sum using the same techniques as described in FIGS. 7B and 7C in order to obtain the guard and sticky bits for the overflow sum.

The sum and overflow sum will be correct for any rounding mode except the round to nearest even (RNE). For RNE, the last bit may need to be corrected but this is readily achieved using the guard and sticky bits computed above. The guard and sticky bits are also used to determine whether to set the inexact flags. These techniques will be well understood to floating point circuit designers, and accordingly will not be discussed further herein.

Figure 8:
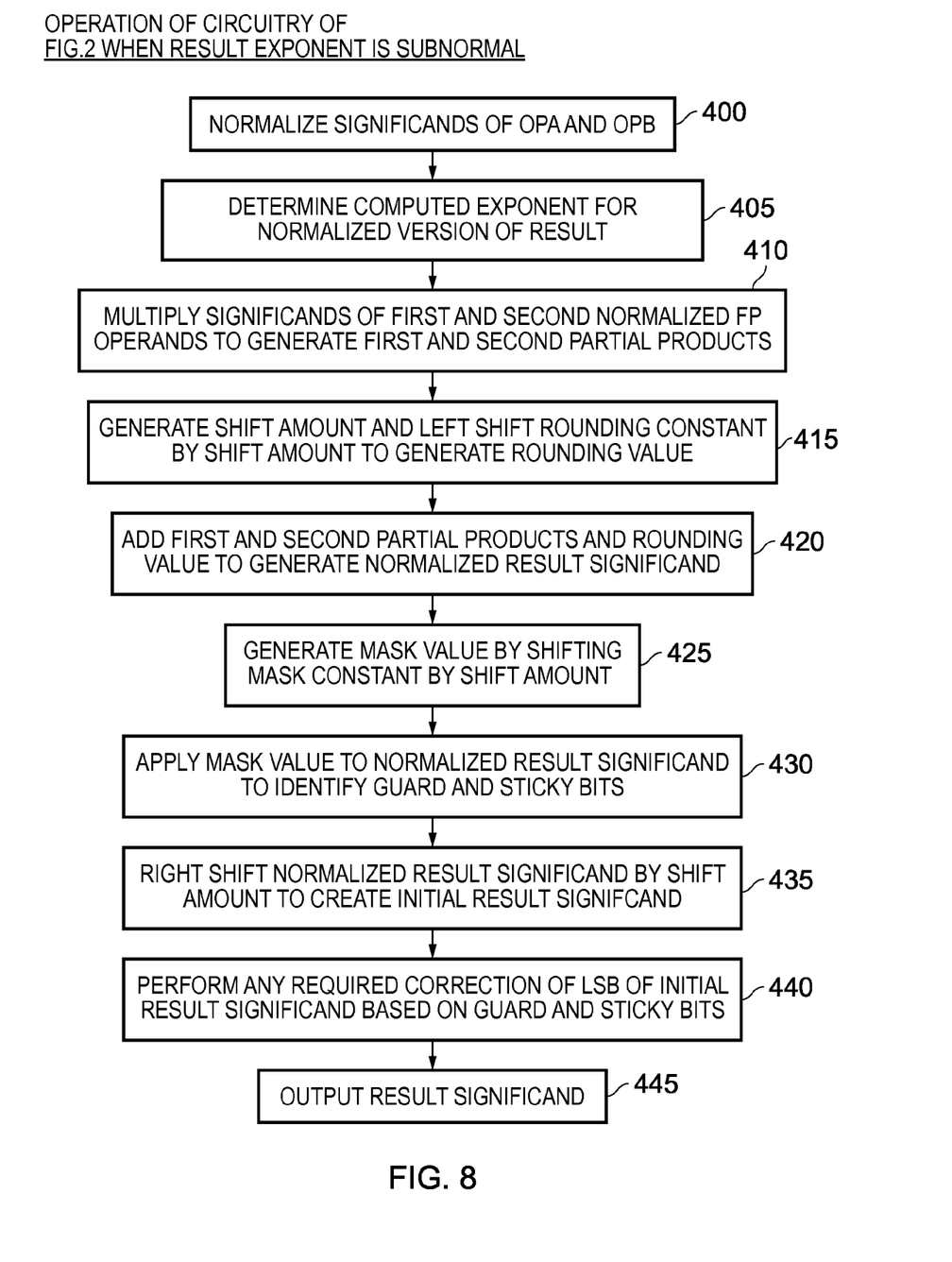
FIG. 8 is a flow diagram illustrating the operation of the circuitry of FIG. 2 in situations where the result exponent is subnormal.

FIG. 8 is a flow diagram illustrating the operation of FIG. 2 when the computed result exponent is subnormal. At step 400, the significands of operand A and operand B are normalised as required in stage V1. Also, at step 405, the computed exponent is determined for the normalised version of the result, as discussed earlier with reference to FIG. 3.

At step 410, the significands of the first and second normalised floating point operands are multiplied in order to generate first and second partial products, this taking place during stage V2. Also, during stage V2, at step 415 a shift amount is generated (for example using the technique described in FIG. 4) and a rounding constant is then left shifted by that shift amount to generate a rounding value (for example using the technique described in FIGS. 5A and 5B).

At step 420, during stage V3, the first and second partial products are added together along with the rounding value in order to generate a normalised result significand output from the adder 220.

At step 425, a mask value is generated by shifting a mask constant by the shift amount, for example using the technique described earlier with reference to FIG. 6. Step 425 is in one embodiment performed in stage V2.

At step 430, the mask value is applied to the normalised result significand in order to identify the guard and sticky bits, for example using the techniques described in FIGS. 7A to 7C. In addition, at step 435, the normalised result significand is right shifted by the shift amount in order to create an initial result significand.

Thereafter, at step 440, any required correction of the least significant bit of the initial result significand is performed based on the guard and sticky bits generated at step 430. This results at step 445 in the output of the result significand which can then be combined with the sign and the exponent value in order to generate the product result. For subnormal products, the final product exponent will be all zeros in order to represent the minimum exponent of −1022. Hence, the computed exponent gets overridden with this value for subnormal products. In one embodiment, steps 430 to 445 are performed during stage V3.

The above-described techniques provide a low-latency method for rounding normalised products that may be subnormal. In particular, it enables injection rounding to be used to correctly round the normalised products that may be subnormal, and can take account of the non-fixed locations at which injection rounding needs to be performed when handling subnormal products. The technique described in FIG. 2 provides a particularly high performance technique, enabling multiplication to be performed, including the required injection rounding, within three cycles on any inputs, in any mode. It also provides a solution which is relatively compact, and hence relatively cheap to implement.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus for multiplying first and second normalized floating point operands to generate a result, each normalized floating point operand comprising a significand and an exponent, the data processing apparatus comprising:

exponent determination circuitry configured to compute a result exponent for a normalized version of the result;
   rounding value generation circuitry configured to generate a rounding value by shifting a rounding constant in a first direction by a shift amount that is dependent on the result exponent;
   partial product generation circuitry configured to multiply the significands of the first and second normalized floating point operands to generate first and second partial products;
   adder circuitry configured to add the first and second partial products and the rounding value to generate a normalized result significand; and
   shifting circuitry configured to shift the normalized result significand in a second direction opposite to said first direction, by said shift amount in order to generate a rounded result significand.

2. A data processing apparatus as claimed in claim 1, further comprising:

mask generation circuitry configured to generate a mask value by shifting a mask constant in said first direction by said shift amount;
   guard and sticky bit detection circuitry configured to apply the mask value to the normalized result significand to identify guard and sticky bits within the normalized result significand; and result adjustment circuitry configured to adjust the rounded result significand dependent on the guard and sticky bits.

3. A data processing apparatus as claimed in claim 2, wherein each bit of the mask constant is set to a predetermined bit value, and the mask generation circuitry is configured, when shifting the mask constant in said first direction by said shift amount, to set to said predetermined bit value the least significant bit positions from which the mask constant is shifted and to include those least significant bit positions in the mask value along with the shifted mask constant.

4. A data processing apparatus as claimed in claim 1, wherein said shift amount is set to identify a zero shift if the result exponent is in a normal range.

5. A data processing apparatus as claimed in claim 1, further comprising an input interface for receiving first and second input floating point operands used to form said first and second normalized floating point operands, the data processing apparatus comprising:
normalization circuitry configured to be responsive to one of said first and second input floating point operands being a subnormal operand, to form the corresponding normalized floating point operand to have a significand formed by shifting the significand of the subnormal operand in said first direction by a normalising amount and to have an exponent formed by adjusting the exponent of the subnormal operand dependent on said normalising amount.

6. A data processing apparatus as claimed in claim 1, further comprising:
shift amount generation circuitry configured to generate said shift amount such that, if the result exponent is subnormal, the shift amount is dependent on a difference between the result exponent and a minimum normal exponent value.

7. A data processing apparatus as claimed in claim 6, wherein the shift amount generation circuitry is configured to restrict the shift amount to not exceed a predetermined maximum shift amount.

8. A data processing apparatus as claimed in claim 1, wherein the rounding constant is dependent on a rounding mode used by the data processing apparatus.

9. A data processing apparatus as claimed in claim 1, wherein the rounding value generation circuitry is configured, when shifting the rounding constant in said first direction by said shift amount, to set to a predetermined bit value the least significant bit positions from which the rounding constant is shifted, and to include those least significant bit positions in the rounding value along with the shifted rounding constant.

10. A data processing apparatus as claimed in claim 9, wherein the predetermined bit value is dependent on a rounding mode used by the data processing apparatus.

11. A method of operating a data processing apparatus to multiply first and second normalized floating point operands in order to generate a result, each normalized floating point operand comprising a significand and an exponent, the method comprising:
computing, by exponent determination circuitry, a result exponent for a normalized version of the result;
generating, by rounding value generation circuitry, a rounding value by shifting a rounding constant in a first direction by a shift amount that is dependent on the result exponent;
multiplying, by partial product generation circuitry, the significands of the first and second normalized floating point operands to generate first and second partial products;
adding, by adding circuitry, the first and second partial products and the rounding value to generate a normalized result significand; and
shifting, by shifting circuitry, the normalized result significand in a second direction opposite to said first direction, by said shift amount in order to generate a rounded result significand.

12. A data processing apparatus for multiplying first and second normalized floating point operands to generate a result, each normalized floating point operand comprising a significand and an exponent, the data processing apparatus comprising:
means for computing a result exponent for a normalized version of the result;
means for generating a rounding value by shifting a rounding constant in a first direction by a shift amount that is dependent on the result exponent;
means for multiplying the significands of the first and second normalized floating point operands to generate first and second partial products;
means for adding the first and second partial products and the rounding value to generate a normalized result significand; and
means for shifting the normalized result significand in a second direction opposite to said first direction, by said shift amount in order to generate a rounded result significand.

* * * * *